United States Patent
Menon et al.

(10) Patent No.: US 9,432,838 B2
(45) Date of Patent: Aug. 30, 2016

(54) SYSTEM AND METHODS FOR ACCOUNT CREATION USING A FEATURE PHONE

(71) Applicant: PAYPAL, INC., San Jose, CA (US)

(72) Inventors: Suraj Satheesan Menon, San Jose, CA (US); Amol Patel, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/133,135

(22) Filed: Dec. 18, 2013

(65) Prior Publication Data

US 2015/0044987 A1    Feb. 12, 2015

Related U.S. Application Data

(60) Provisional application No. 61/864,445, filed on Aug. 9, 2013.

(51) Int. Cl.

| H04W 4/24 | (2009.01) |
|---|---|
| H04W 8/20 | (2009.01) |
| G06Q 10/00 | (2012.01) |
| G06Q 20/32 | (2012.01) |
| H04M 15/00 | (2006.01) |
| H04M 11/00 | (2006.01) |

(52) U.S. Cl.
CPC .............. *H04W 8/20* (2013.01); *G06Q 10/00* (2013.01); *G06Q 20/322* (2013.01); *H04M 15/705* (2013.01); *H04M 15/715* (2013.01); *H04M 15/72* (2013.01); *H04W 4/24* (2013.01)

(58) Field of Classification Search
CPC ......... H04W 8/20; H04W 4/24; H04W 4/12; H04W 4/14; H04M 2215/32; H04M 15/00; H04M 2215/2026; H04M 17/00; H04M 15/68; H04M 2215/0196; H04M 15/765; H04M 15/7652; H04M 17/103; H04M 17/106; H04M 17/20; H04M 17/204; H04M 2017/12; H04M 2017/14; H04M 2017/24; H04M 2215/724; H04M 2215/7245; H04M 3/382; H04M 3/4211; H04M 3/493; G06Q 20/40; G06Q 20/4012
USPC .............. 455/406, 410–414.1, 432.3; 705/44
See application file for complete search history.

(56) References Cited

U.S. PATENT DOCUMENTS

| 7,174,311 B1 * | 2/2007 | Galietti ............. G06F 17/30011 434/350 |
|---|---|---|
| 7,831,246 B1 | 11/2010 | Smith et al. |
| 2008/0046580 A1 * | 2/2008 | Lafuente ........... H04M 3/42246 709/229 |

(Continued)

FOREIGN PATENT DOCUMENTS

| WO | WO 03/010951 | * | 2/2003 | ............. H04M 11/00 |

*Primary Examiner* — Allahyar Kasraian
*Assistant Examiner* — B. M. M Hannan
(74) *Attorney, Agent, or Firm* — Haynes and Boone, LLP

(57) ABSTRACT

There is provided systems and method for account creation using a feature phone. A user is able to create an account through a feature phone using limited or no Internet access. A user may request to set up an account with a payment provider and the user is asked to confirm that certain information can be provided to the service provider, such as a name, address, and identifier. Once confirmed correct, the user enters the date of birth. The service provider then request and/or creates an email associated with the account. The service provider then calls the user enter a payment card number, along with an expiration date and security code, as a funding source for the account. The user further establishes a PIN for future transactions. Once confirmed, the account is active and ready to use.

20 Claims, 10 Drawing Sheets

(56) References Cited

U.S. PATENT DOCUMENTS

| | | | |
|---|---|---|---|
| 2009/0081989 A1* | 3/2009 | Wuhrer | G06Q 20/10 455/406 |
| 2009/0298427 A1* | 12/2009 | Wilkinson | G06Q 20/20 455/41.1 |
| 2010/0191602 A1* | 7/2010 | Mikkelsen | G06Q 20/322 705/14.64 |
| 2011/0137742 A1* | 6/2011 | Parikh | 705/26.1 |
| 2012/0041873 A1* | 2/2012 | Korosec et al. | 705/39 |
| 2012/0158658 A1 | 6/2012 | Wilkerson | |
| 2013/0038800 A1* | 2/2013 | Yoo | 348/734 |
| 2013/0054454 A1* | 2/2013 | Purves et al. | 705/41 |
| 2013/0165086 A1* | 6/2013 | Doulton | 455/414.4 |
| 2014/0134975 A1* | 5/2014 | Frankel et al. | 455/406 |
| 2014/0201086 A1* | 7/2014 | Gadotti et al. | 705/72 |
| 2015/0039498 A1* | 2/2015 | Weiss | G06Q 20/102 705/40 |

\* cited by examiner

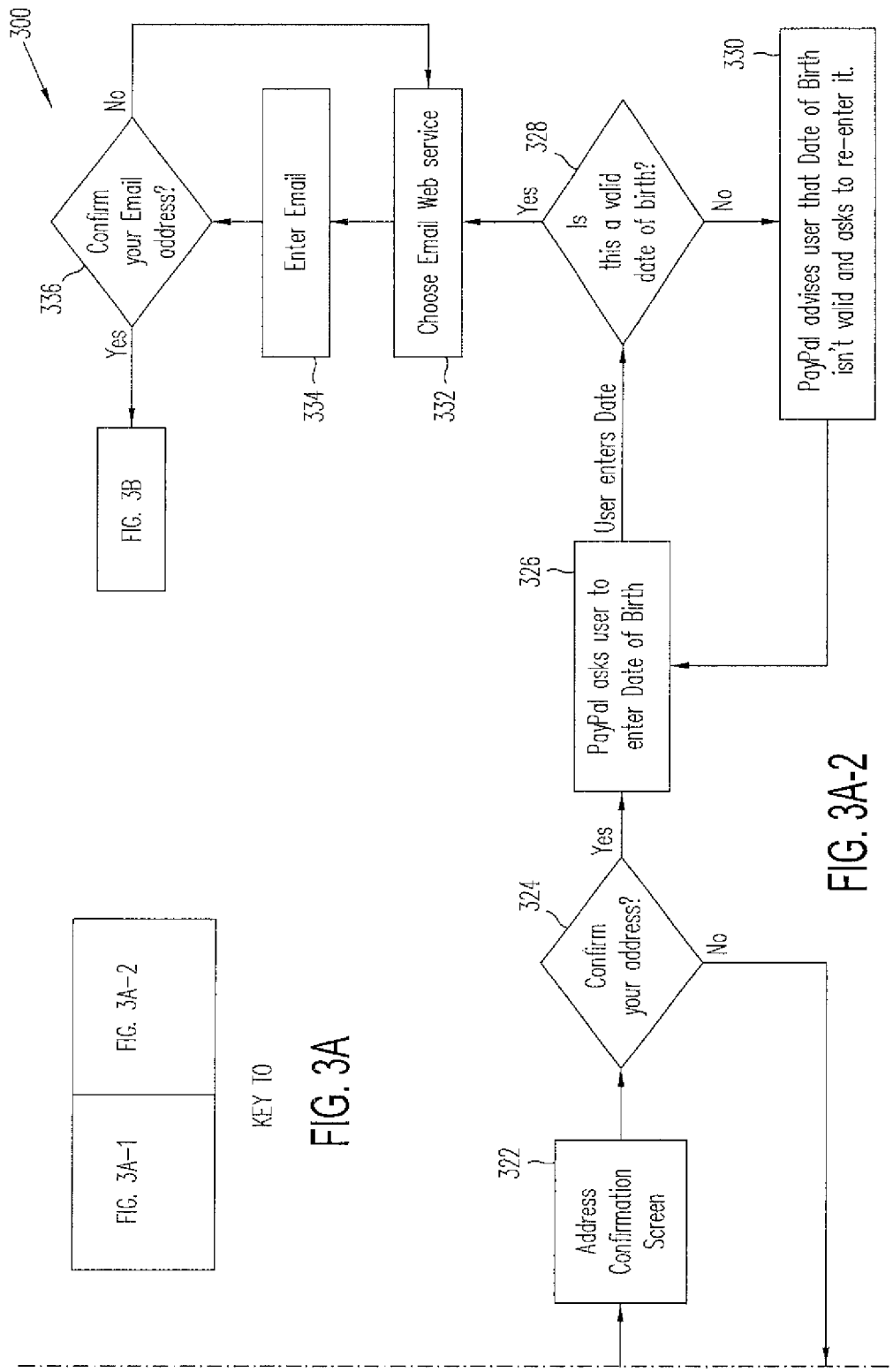

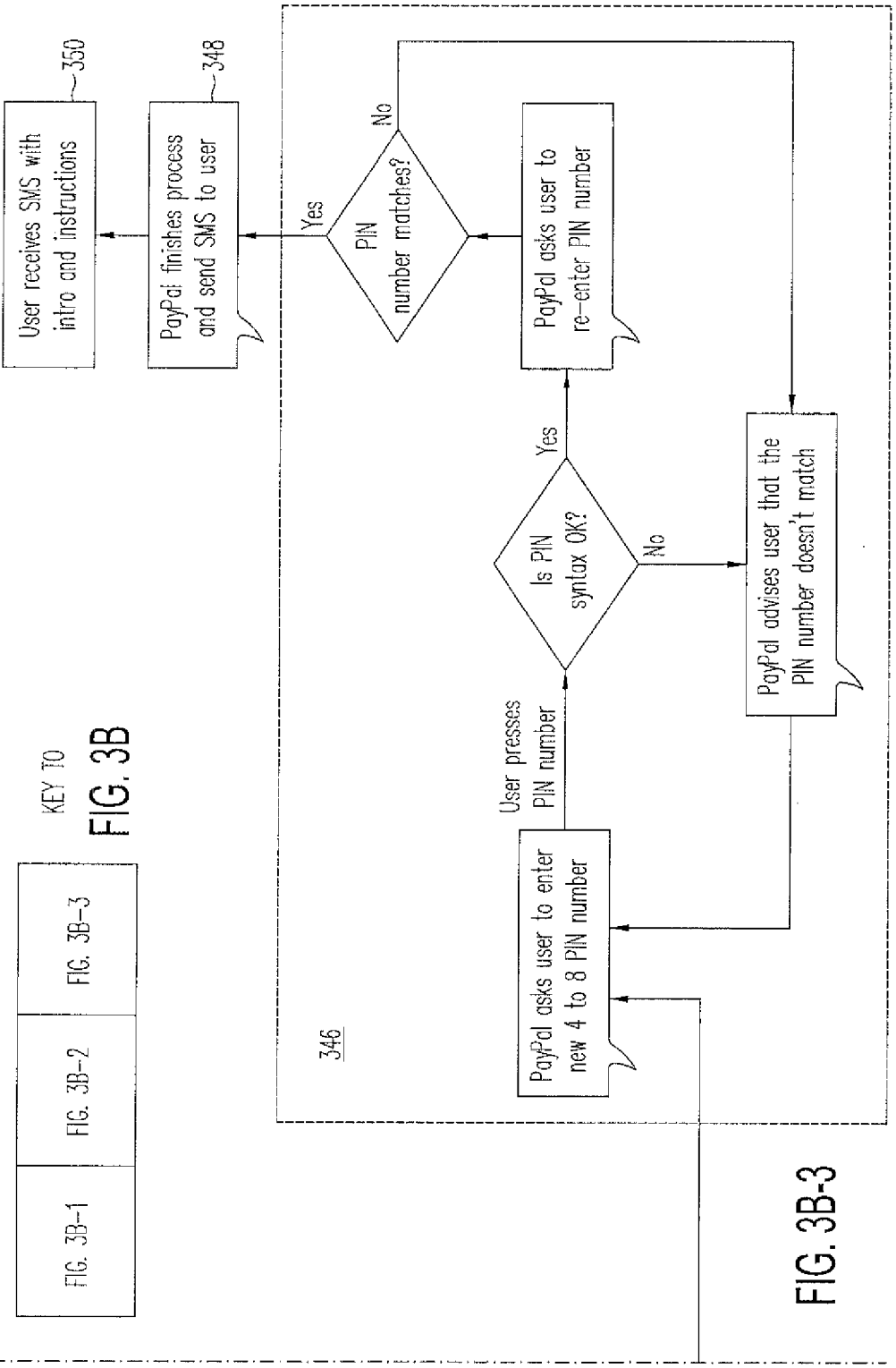

SYSTEM AND METHODS FOR ACCOUNT CREATION USING A FEATURE PHONE

CROSS REFERENCE TO RELATED APPLICATION

The present application claims priority to U.S. Provisional Patent Application Ser. No. 61/864,445, filed Aug. 9, 2013, which is incorporated by reference in its entirety.

TECHNICAL FIELD

Example embodiments of the present application relate generally to account creation using a feature phone, and more specifically to creating an account with a payment provider through a feature phone by utilizing a mobile transaction gateway.

BACKGROUND

Current wireless phone technology provides for smartphones and feature phones. Smartphones usually include a large display, data connectivity (in addition to voice connectivity), and an advanced processor that is operable to execute applications. Many smartphones provide robust capabilities. For instance, 4G smartphones provide Internet connectivity with relatively fast upload and download speeds and usually offer a wide variety of Internet-connected applications that provide utility and entertainment. Feature phones, by contrast, offer basic features and are centered on voice connectivity rather than data connectivity. Some feature phones provide Internet connectivity with a browser. However, the browser may not provide the same features as applications available with a smart phone, and typing may be difficult using keypads of a feature phone. Additional data capabilities offered by feature phones may include Short Message Service (SMS) messaging and Unstructured Supplementary Service Data (USSD) messaging.

While smartphones are quite common in the developed world, feature phones tend to predominate in developing economies. Furthermore, some mobile services carriers, mostly in developing economies, have begun to use USSD messaging to provide payment by users of feature phones. In one example, a user of a feature phone "tops up" his or her minutes on the feature phone by providing cash to a vendor at a physical location and then entering data associated with the transaction using a USSD session with a mobile carrier. Thus, USSD can be used in very basic monetary transactions.

PAYPAL®, Inc. of San Jose, Calif., USA, currently provides methods for online payments and money transfers. In fact, PAYPAL® provides a cloud-based wallet to its users with very robust and sophisticated abilities. The cloud-based wallet allows for electronic transactions using any of a number of payment methods (e.g., credit cards, bank accounts, etc.) to any registered payee or from any registered payer. However to use these services, a user must first create an account with the service or payment provider.

Figure 1:
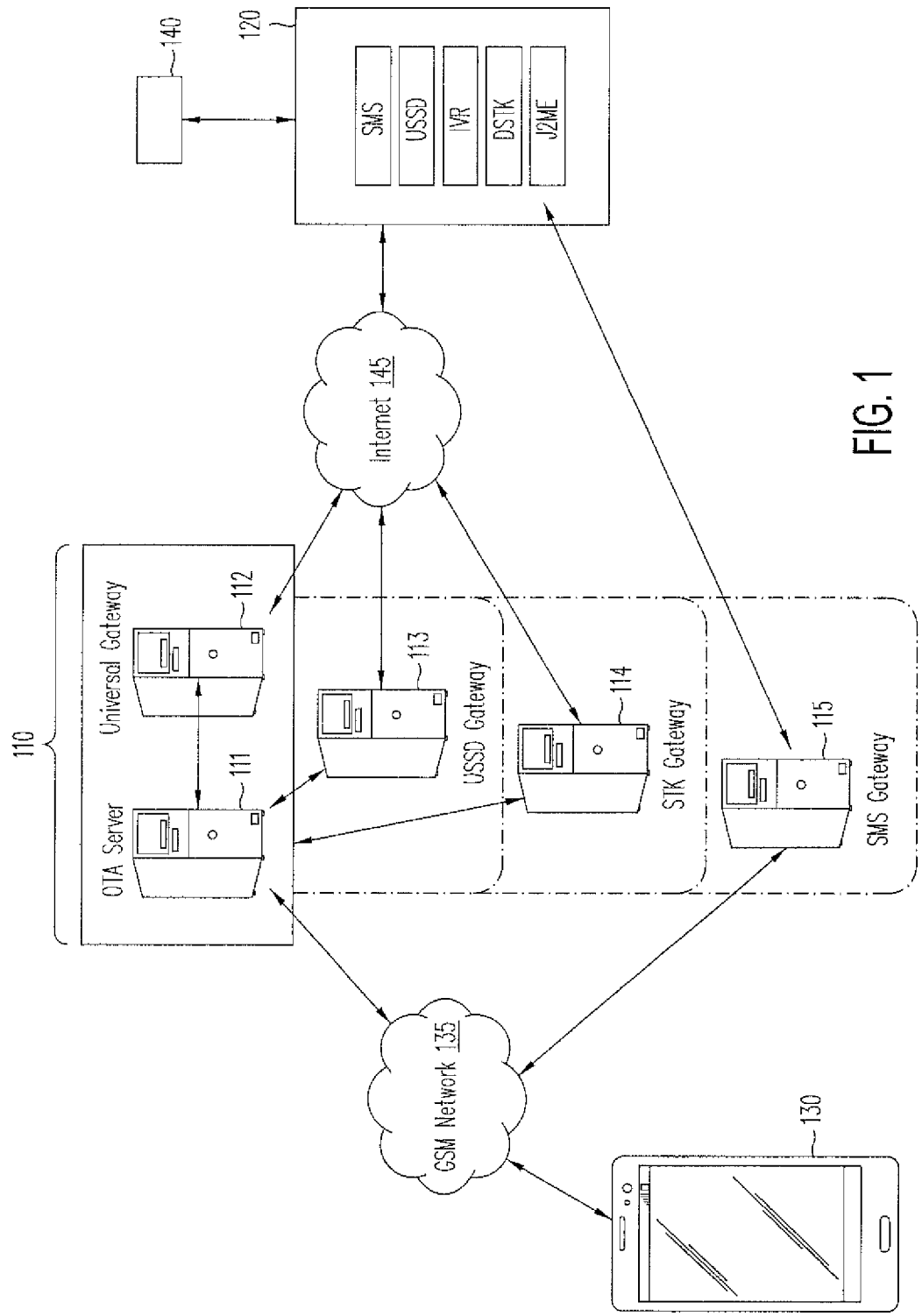
FIG. 1 is a block diagram of a networked system displaying exemplary communication channels between a mobile device and one or more services for account creation using a feature phone suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for account creation using a feature phone through a mobile transaction gateway (MTG). Systems suitable for practicing methods of the present disclosure are also provided. It is to be understood that the following disclosure provides many different embodiments, or examples, for implementing different features of the present disclosure. Specific examples of components and arrangements are described below to simplify the present disclosure. These are merely examples and are not intended to be limiting. Various features may be arbitrarily drawn in different scales for simplicity and clarity.

Various embodiments provide access to and creation of a user account at a feature phone that may have limited or no Internet access. In one non-limiting example, the user interacts with a service provider via Unstructured Supplementary Service Data (USSD) messaging. The user may set up an account with the service offering a cloud-based wallet without accessing the Internet. In such examples, the, payment service, for example an e-commerce service provider offering the cloud-based wallet, may provide a menu interface on the phone's screen, through which the user may navigate.

Some embodiments include an MTG that communicates with a messaging gateway at the mobile carrier. The payment service has its own computers that communicate with the MTG, thereby exposing the services of the cloud-based wallet to the MTG. The MTG includes computer-executable code, which, when executed by one or more processors at the MTG, manages communications to and from the user's mobile phone. The MTG includes fraud management, certificate lookup, user information database management, and communication with the mobile carrier and payment service. Thus, one example includes a MTG that is between the mobile carrier and the payment service, where the MTG communicates with the user's phone (via the mobile carrier) and the payment service to manage account set-up and transactions.

It is a feature of various embodiments that the communications with the user occur on a communications channel other than the Internet. As mentioned above, USSD provides one such communications channel; however, the scope of embodiments is not so limited. Other embodiments may use, for example, SMS messaging, Interactive Voice Response (IVR), a SIM Tool Kit (STK) application, a Java 2 Platform, Micro Edition (J2ME) application, and/or the like.

The user may access the cloud-based wallet to enjoy a comprehensive set of financial transaction options. For instance, the user may access a debit account, a credit account, a bank account, or any other account that is linked with the payment service. The user may also pay, or be paid by, any counterparty linked to the payment service. Thus, in contrast to conventional techniques that provide only payment to specific payees (e.g., payment to a mobile carrier), various embodiments provide payments to and from any arbitrary counterparty using any of a variety of payment methods.

FIG. 1 is a block diagram of a networked system displaying exemplary communication channels between a mobile device and one or more services for account creation using a feature phone suitable for implementing the process described herein, according to an embodiment. As shown, the system of FIG. 1 may comprise or implement a plurality of devices, servers, and/or software components that operate to perforin various methodologies in accordance with the described embodiments. Exemplary devices may include devices operating mobile device operating systems (OS) including a device OS offered by SAMSUNG®, BLACKBERRY®, MICROSOFT®, QUALCOMM®, or other mobile feature phone provider. Exemplary servers may include stand-alone and enterprise-class servers, operating an OS such as a MICROSOFT® OS, a UNIX® OS, a LINUX® OS, or other suitable server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

Mobile device 130 may be utilized to establish an account with payment service 140. In certain embodiments, mobile device 130 utilizes one or more communications paths of mobile service carrier 120 to establish the account with payment service 140. Mobile transaction gateway (MTG) 120 may be utilized to provide an intermediary service to facilitate the establishment of a payment account. MTG 120 provide communication management between mobile services carrier 110 and payment service 140 by, for example, providing computer-executable code to create and transmit messages between user device 110 and payment service 140.

Mobile services carrier 110, MTG 120, mobile device 130, and payment service 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of FIG. 1.

FIG. 1 shows communication channels utilized by mobile device 130 (e.g., a feature phone) with mobile service carrier 110, MTG 120, and payment service 140. Payment service 140 may be maintained, for example, by an online payment service provider that provides a cloud-based wallet, including transaction processing and payment information storage.

For instance, payment service 140 may correspond to EBAY®, Inc. of San Jose, Calif., USA, PAYPAL®, Inc. of San Jose, Calif., USA, or another e-commerce service provider including a merchant, financial services provider, and/or other service provider. Payment service 140 administers the payment methods and money transfers and provides the cloud-based wallet for the user. While not shown in FIG. 1 it is noted that payment service 140 may be accessible in other ways, such as directly via Internet 145 from other users (not shown) by a personal computer or smartphone.

Payment service 140 includes one or more processing applications which may be configured to interact with mobile device 130 to facilitate establishment of a user account. Payment service 140 may additionally perform payment and transaction processing services, including establishment, payment, and/or renewal of mobile phone bills corresponding to mobile phone 130. Thus, payment service 140 may include an account establishment application and a wallet application, which may correspond to processes, procedures, and/or applications executable by a hardware processor, for example, a software program. In other embodiments, payment service 140 may include additional or different software as required.

An account establishment application of payment service 140 may correspond to an application configured to receive a request to establish an account with payment service 140 and communicate messages between mobile device 130 and payment service 140 to complete establishment of the account. In this regard, the account establishment application may communicate with MTG 120 using one or more Application Programming Interfaces (APIs), which expose the underlying account establishment functionality to MTG 120, including account establishment and/or management with a wallet application. MTG 120 may be used to communicate message between mobile device 130 and payment service 140 to perform the requested actions of the account establishment application and/or wallet application, as will be discussed in more detail herein.

A wallet application of payment service 140 may be utilized to permit user 102 to select payment options and provide payment for items and/or services. Thus, the wallet application may receive and/or transmit information between mobile device 130 and payment service 140 for processing and completion of financial transactions. For example, the wallet application may correspond to a cloud-based wallet application enabling a user of mobile device 130 to complete payment using an account with the wallet application for items and/or services, including mobile phone service (e.g. purchases of minutes, text messages, and/or data plans). The wallet application may also communication with MTG 120 using one or more Application Programming Interfaces (APIs), which expose the underlying cloud-based wallet functionality to MTG 120. Additionally, the wallet application may provide transaction histories, including receipts, for use by a user of mobile device 130.

Additionally, payment service 140 may include one or more databases. As previously discussed, a user of mobile device 130 may establish one or more user accounts with payment service 140. User accounts in the database may include user information, such as name, address, birthdate, payment/funding information, additional user financial information, and/or other desired user data. A user may link user accounts to mobile device 130 through a mobile device identifier. Thus, when a mobile device identifier corresponding to mobile device 130 is transmitted to payment service 130, a user account may be found.

MTG 120 may include one or more devices, including computer servers as previously discussed, that manage a mobile session to facilitate one or more financial transactions with a user at mobile device 130. In this regard, MTG 120 includes one or more processing applications, which may be configured to provide an interface for a user of mobile device 130 to access payment service 140 using at least one of SMS messaging, USSD messaging, IVR, an STK application, and/or a J2ME application. Thus, MTG 120 includes one or more workflow application configured to implement business logic to create and send messages to mobile device 130 and communicate with payment service 140 for account establishment and management. The workflow application may also be in communication with payment service 140 using one or more Application Programming Interfaces (APIs), which expose the underlying workflow functionality to payment service 140. MTG 120, including the workflow application and/or other components of MTG 120, is described in more detail with respect to FIG. 2. While MTG 120 is shown as separate from payment service 140, it is understood in various embodiments MTG 120 may be incorporated within payment service 140.

MTG 120 communicates over Internet 145 with mobile service carrier 110. Although FIG. 1 shows Internet 145 between MTG 120 and mobile service carrier 110, it is noted that any data connection (with or without Internet 145) may be used in various embodiments. Furthermore, even though Internet 145 is shown in FIG. 1 it is still true that mobile device 130 may not have an Internet connection with payment service 140 because mobile device 130 does not, itself, communicate over Internet 145 and is unaware of the use of the Internet in one of the paths of communication. Thus, the embodiment of FIG. 1 is designed to perform even if the user at mobile device 130 has no Internet access through mobile device 130 (or has Internet access but chooses not to use it).

Mobile device 130 may correspond to a feature phone with limited or no Internet connectivity. Thus, in various embodiments, mobile device 130 may be implemented using any appropriate hardware and software configured for wireless communication using mobile services carrier 110 and with MTG 120 and payment service 140. Although only one mobile device is shown, a plurality of mobile devices may be utilized.

Mobile device 130 includes one or more communication applications configured for creating, transmitting, and/or receiving messages, including for the establishment of a user account with payment service 140. The communication application may correspond to processes, procedures, and/or applications executable by a hardware processor, for example, a software program. In other embodiments, mobile device 130 may include additional or different software as required.

Communication application(s) of the mobile device 130 may correspond to an application enabling the establishment of a communication message. In this regard, the communication application(s) may correspond to communication utilizing one or more of USSD messaging, SMS messaging, IVR, an STK application, and/or a 2JME application. Thus, the communication application(s) may provide an interface for the establishment, transmission, and/or reception of an electronic message. In various embodiments, the communication application may be configured to receive telecommunications from payment service 140 to complete establishment and verification of an account. Thus, mobile device 130 may include processes operable to make and receive telephone calls over a radio link. Therefore, the communication application(s) may enable a user to transmit a request to establish an account to payment service 140 and receive messages enabling the establishment of the account, as will be discussed in more detail herein.

Mobile services carrier 110 includes Over The Air (OTA) server 111 and gateways 112-115. OTA server 111 and gateways 112-115 may be configured to transmit and receive communications between MTG 120 and mobile device 130 using Global System for Mobile Communications (GSM) network 135. OTA server 111 of mobile services carrier 110 receives and transmits communications between any of gateways 112-114 and mobile device 130. For example, universal gateway 112 provides communication between MTG 120 and mobile device 130 over an IVR or a J2ME application through OTA server 111. If mobile device 130 uses USSD messaging, USSD gateway 113 communicates messages to and from MTG 120 through OTA server 111. Similarly, if mobile device 130 accesses payment service 140 using an STK application, STK gateway 114 communicates messages to and from MTG 120 through OTA server 111. However, where mobile device 130 accesses payment service 140 using SMS, SMS gateway 115 may communicate messages to and from MTG 120.

Depending on the communication path/format used between mobile service carrier 110 and mobile device 130, MTG 120 communicates with an appropriate gateway 112-114 of mobile services carrier 110. As explained with respect to FIG. 2, MTG 120 includes the capability to use each one of the different communication techniques as appropriate. Moreover, it is noted that the scope of embodiments is not limited to the list of communication techniques provided above. Thus, any appropriate communication technique now known or later developed may be used with various embodiments.

Where mobile device 130 communicates using USSD, a user at mobile device 130 initiates a transaction by formulating a message to a USSD address associated with payment service 140. The message traverses GSM network 135, OTA server 111, USSD gateway 113 and is received by MTG 120 over Internet 145. A USSD session is established, and MTG 120 analyzes the message for an identification of the user. If MTG 120 can verify the user, MTG 120 then follows up with additional messages (as appropriate) and passes information to and from payment service 140 to complete the transaction. In some examples, a given USSD message to the user from MTG 120 appears as a menu, asking the user to select an option by keying in one or more characters and replying to the message. SMS examples may work in a similar way, though SMS examples may be limited to one-hundred forty characters per message, making SMS slightly less convenient for menu-type messages than USSD. In IVR embodiments and embodiments using STK and J2ME applications may also use menu-type configurations, though any organizational arrangement is within the scope of embodiments.

Figure 2:
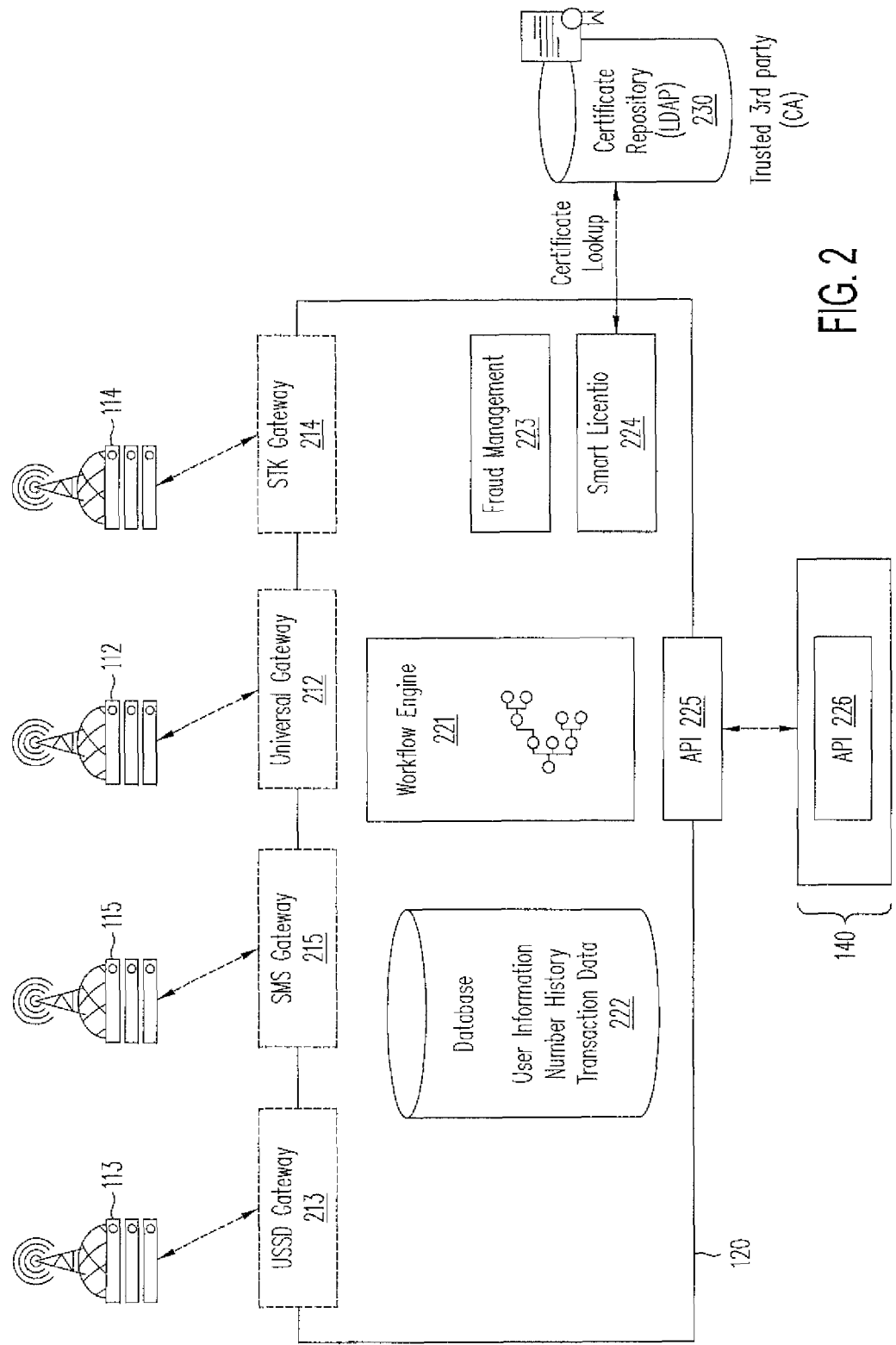
FIG. 2 is an illustration of the exemplary mobile transaction gateway (MTG) of FIG. 1, operative to provide account creation between a feature phone and a payment service, according to one embodiment.

FIG. 2 is an illustration of the exemplary mobile transaction gateway (MTG) of FIG. 1, operative to provide account creation between a feature phone and a payment service, according to one embodiment. MTG 120 includes internal gateways 212-215 to facilitate communication with mobile service carrier gateways 112-115 corresponding to gateways 112-115, respectively, of mobile services carrier 110 of FIG. 1. For instance, USSD gateway 213 is programmed to use the appropriate protocols to send and receive messages using a USSD protocol from USSD gateway 113. Similarly, internal gateways 212, 214, 215 operate similarly. For example, internal gateways 212, 214, 215 may be configured to each use extensible markup language (XML) or other universal language format, simple object access protocol (SOAP), short message peer-to-peer (SMPP), hypertext transfer protocol (HTTP) including HTTP Secure, and SMS.

Figures 1, 3A:
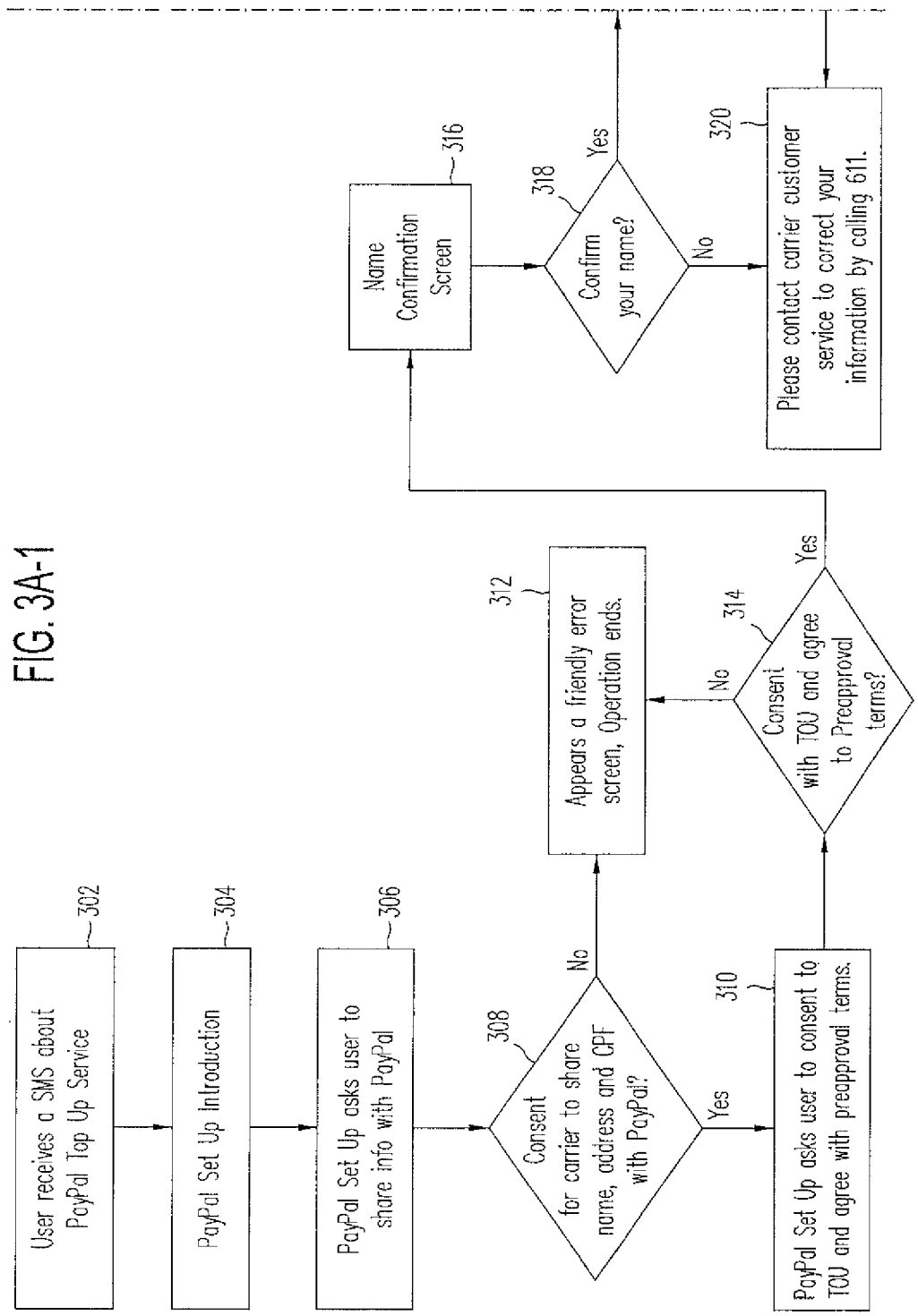
FIG. 3A is an exemplary method for initial account creation using a display of a feature phone, according to an embodiment.
Figures 1, 3B:
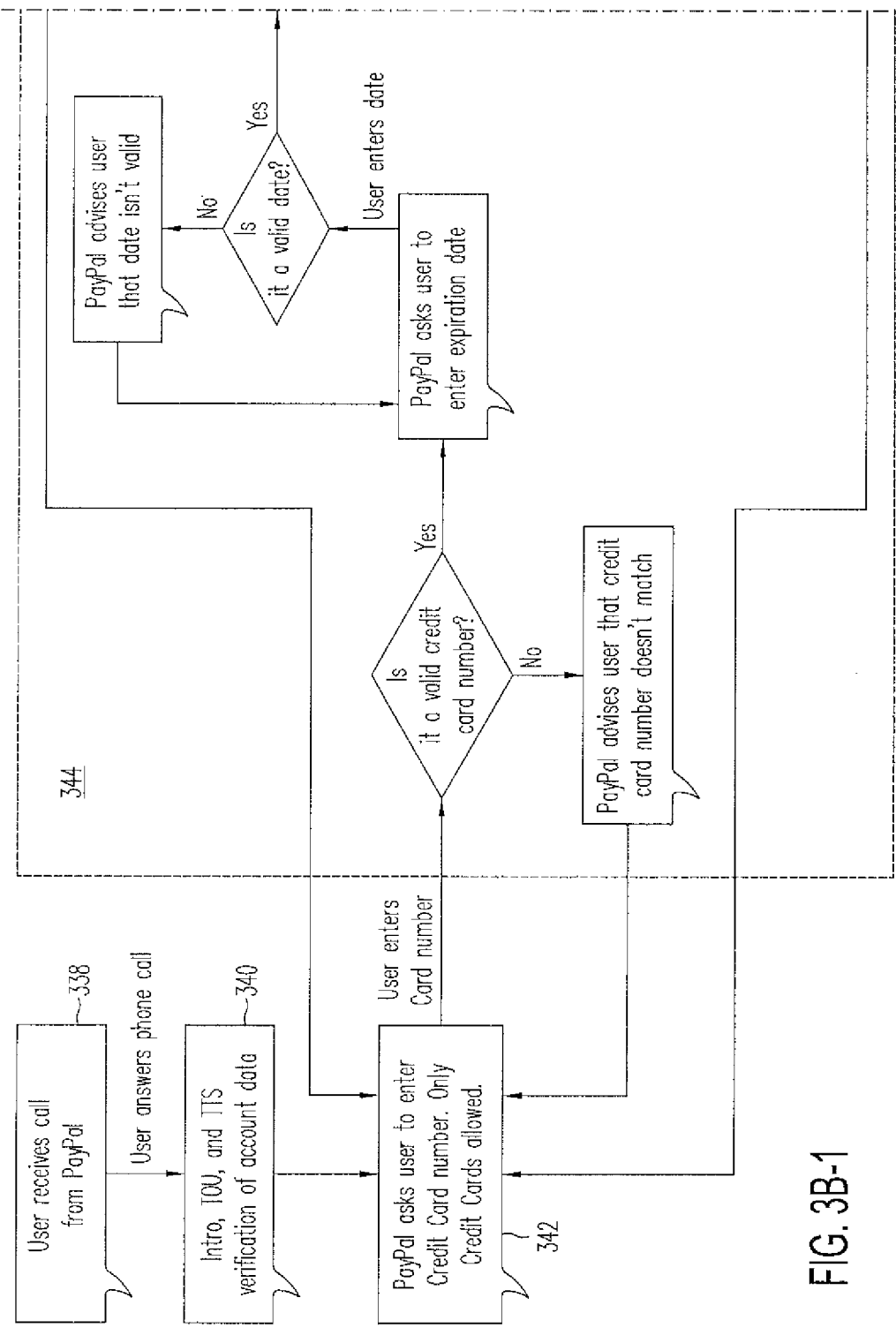
FIG. 3B is an exemplary method for completion of account creation using Interactive Voice Response (IVR) between a feature phone and a payment service, according to one embodiment.
Figures 2, 3B:
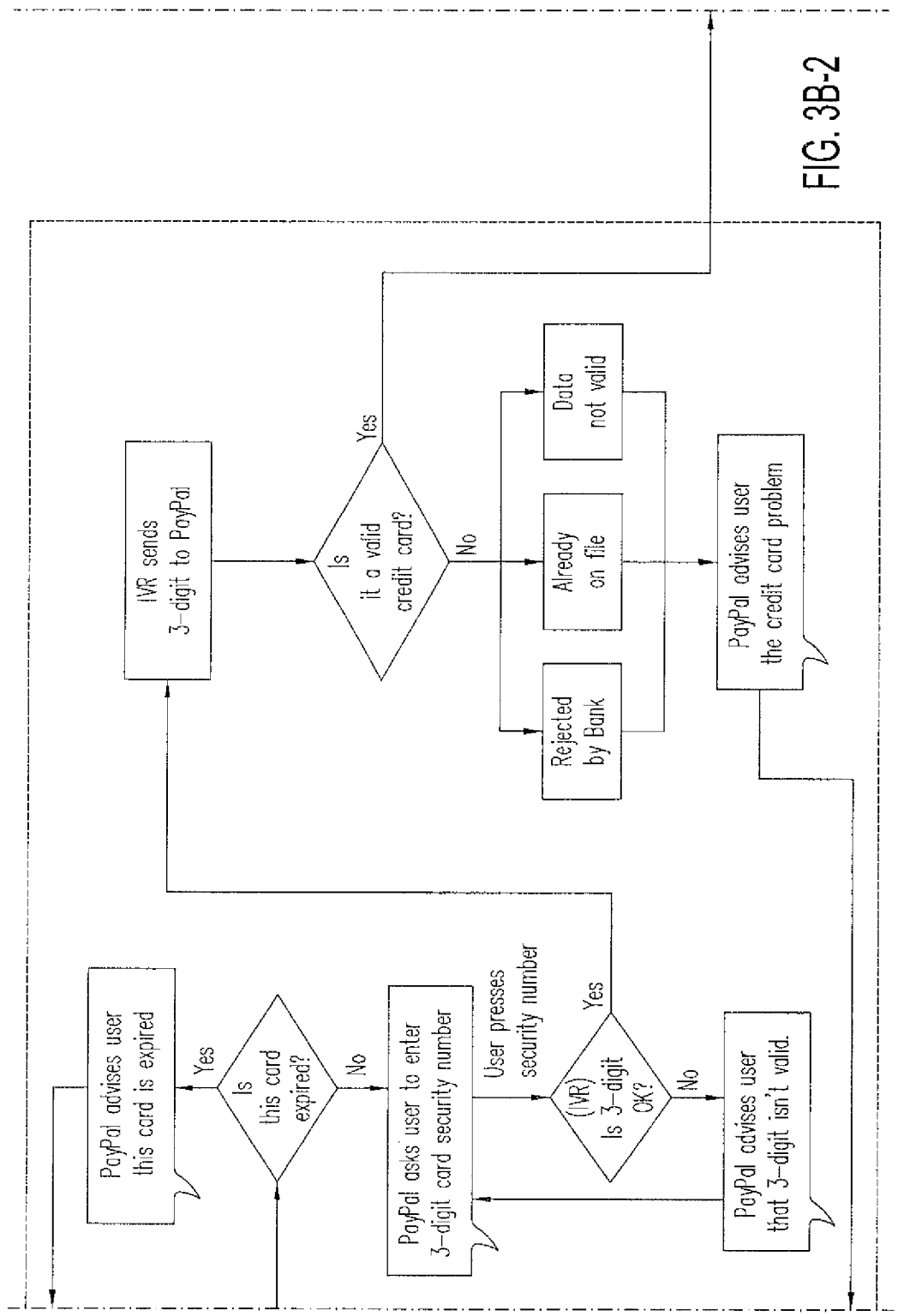
Figure 4A:
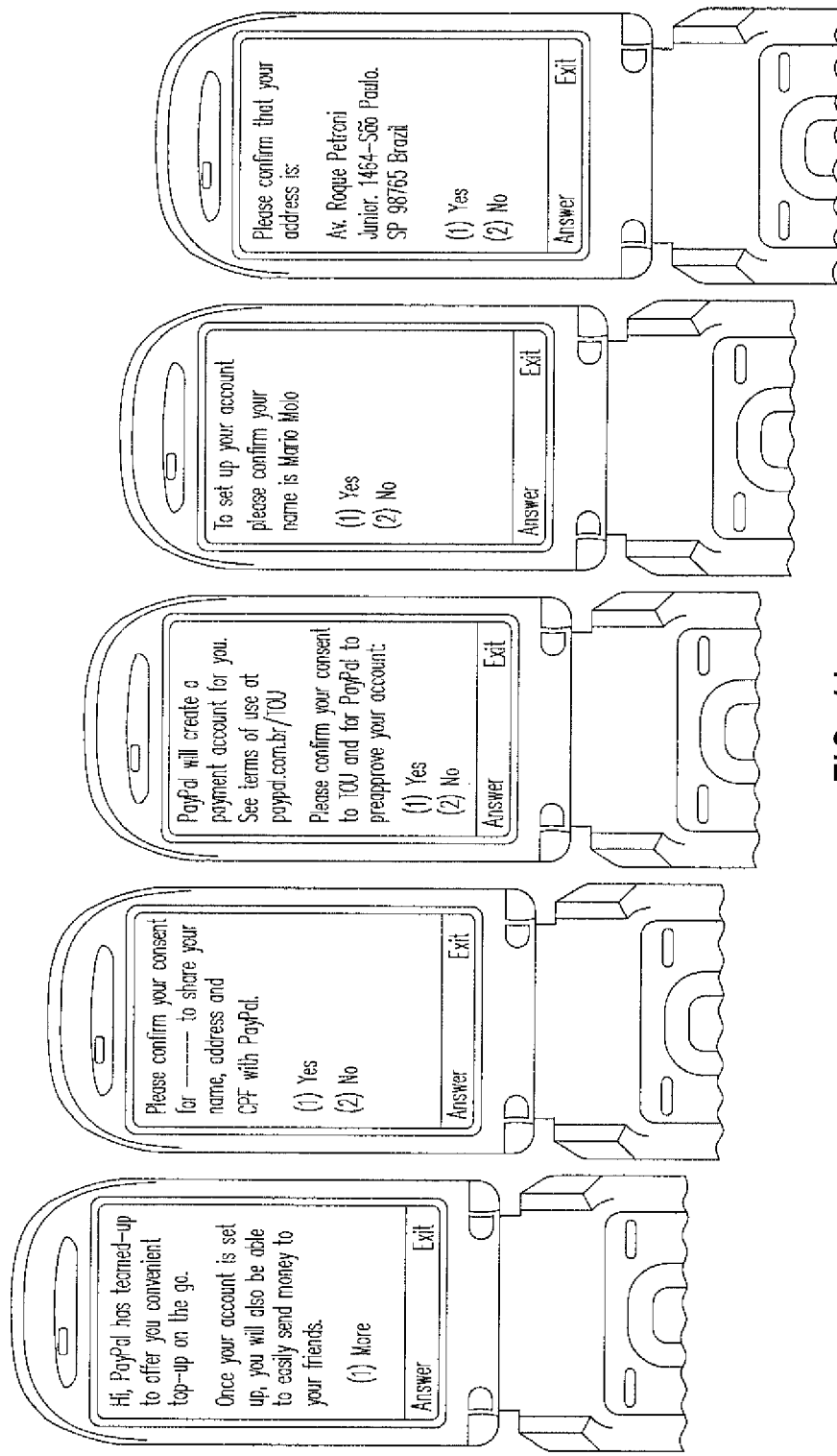
FIGS. 4A and 4B is exemplary menu screen shots that may be provided on an interface of a feature phone (e.g., a LCD screen) from a MTG, according to an embodiment.
Figure 4B:
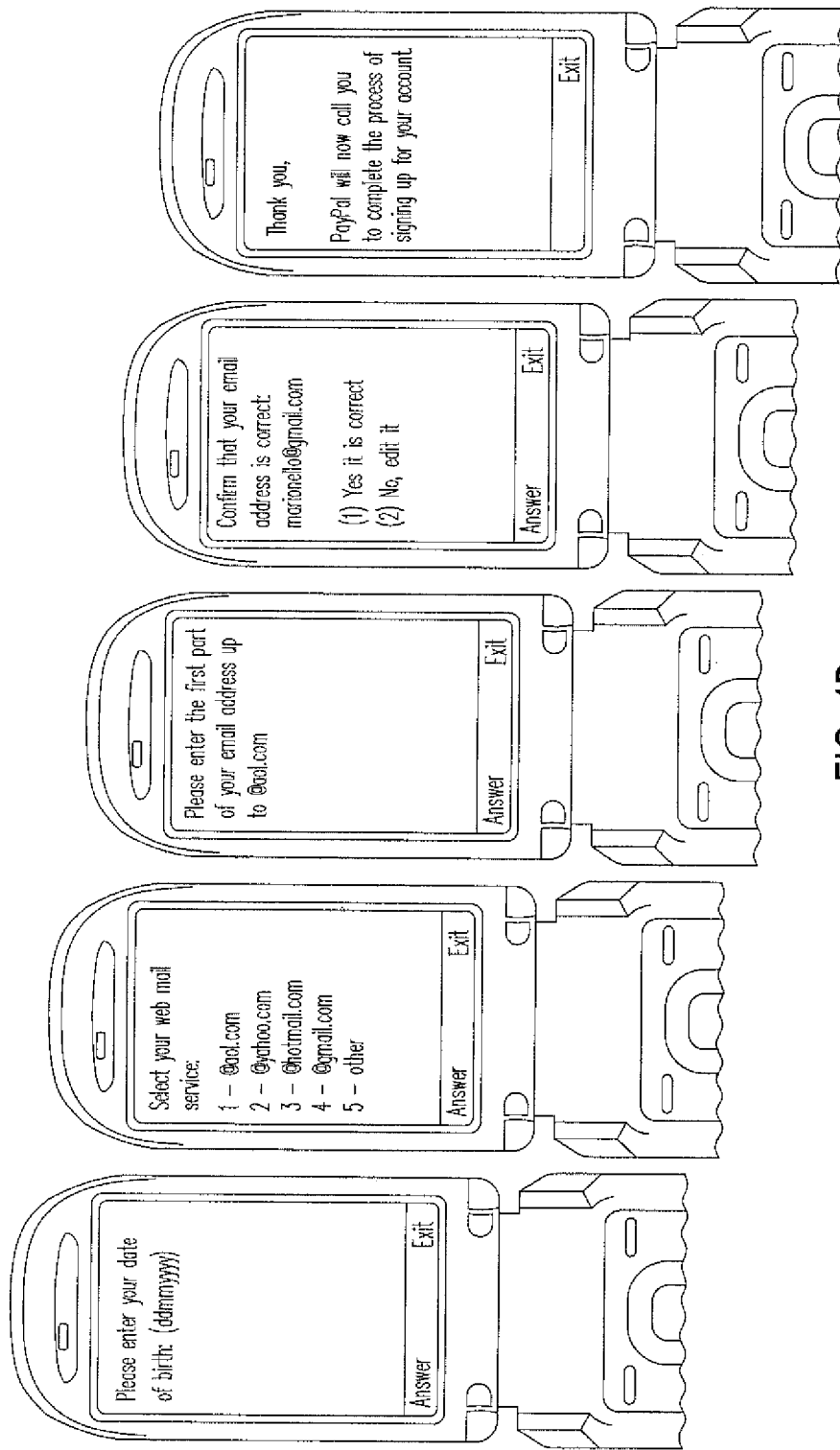

Workflow engine 221 is the main operational program of MTG 120 and provides many of the operations discussed with respect to the flowcharts of FIGS. 3A and 3B and menu screen shots of FIGS. 4A and 4B. Workflow engine 221 includes business logic to implement the variety of use cases discussed with respect to FIGS. 3A, 3B, 4A, and 4B. Among other things, workflow engine 221 includes logic to create messages to send to the user during a requested transaction, to parse messages from the user, and to communicate with payment service 140 in order to perform the requested actions (e.g., managing/creating a cloud-based wallet, making a payment, etc.). Thus, workflow engine 221 may be configured to act as an intermediary for communications between a user device and payment server 140 using one or more communication protocols of a mobile device.

Database 222 includes user information including user and/or device identifiers (e.g., to match a mobile device to one or more user accounts at payment service 140), phone number history (e.g., information about use history associated with a particular phone number or mobile device), and transaction data (e.g., information about specific past transactions). The workflow engine 221 may consult database 222 during the course of a transaction as appropriate. For example, database 222 may be utilized to determine a messaging protocol for a mobile device of a user based on the phone number history and/or device identifier.

Fraud management 223 corresponds to a component of MTG 120 implementing fraud detection logic. For example, for a given USSD session, the following information may be determined by fraud management 223: country and mobile network of the user, cell identity within the mobile network, a phone identifier (IMEI) that can be mapped to a handset model, and a relation between current SIM and phone and if either of them have a history of having been connected to other devices. Other solutions implementing STK applications, J2ME application, IVR, or SMS may gather other or different information. Fraud management 223 can use such information, along with username, password, and other appropriate information to detect suspicious behavior. If suspicious behavior is detected, MTG 120 may suspend or end the transaction or ask for more information. Workflow engine 221 may consult with fraud management engine 226 before establishing an account with payment service 140, approving a money transfer, and/or completing an online transaction including bill payment and/or phone services purchase. Additionally, smart licentio 224 may consult a certificate repository 230 to identify trusted third parties when commanded to do so by workflow engine 221. Smart licentio 224 may correspond to a service to access a certificate repository 230 and provide mobile signature services to provide secure channel communications and to authenticate secure channel requests using a public key repository. Thus, smart licentio 224 may enable secure data communications using USSD, IVR, or other two-way data communication channel through certificate repository 230.

APIs 225 and 226 are the API interfaces MTG 120 and payment service 140, respectively, for communication between MTG 120 and payment service 140. MTG 120 communicates with payment service 140 to complete a requested financial transaction. MTG 120 may include some, but not all, of the logic used to authenticate a requested transaction and to determine whether a requested transaction should go forward. Payment service 140 may include the same or similar logic and may be able independently to verify a transaction and/or to determine whether a transaction should go forward. Furthermore, during a transaction, workflow engine 221 may communicate to payment service 140, via APIs 225 and 226, the identities of payer and payee, an amount of transaction, a selection of payment method, and/or other appropriate data.

FIG. 3A is an exemplary method for initial account creation using a display of a feature phone, according to an embodiment. Note that one or more steps, processes, and methods described herein may be omitted, performed in a different sequence, or combined as desired or appropriate.

Method 300 of FIGS. 3A and 3B may be performed using SMS, USSD, IVR, an application on the handset (e.g. STK and/or J2ME), or any other appropriate technique. Method 300 is used to establish a cloud-based wallet for the user, where the cloud-based wallet is hosted by an e-commerce service provider. In the example of method 300 the e-commerce service provider is indicated as PAYPAL®, Inc. of San Jose, Calif., USA, though other payment services and/or service providers may be used in various embodiments.

At step 302, a user receives an SMS message about a top-up service offered by a payment service. The SMS message may be received by a user device from an MTG on behalf of the payment service. A top-up service may correspond to a service to purchase rate plans corresponding to a mobile phone, including adding minutes to an existing account, purchasing further text messages, and/or purchasing additional data for a data plan. In other embodiments, the user may receive a message corresponding to establishing an account with the payment service for other features, including monetary transfers to other users and/or payment of bills with the payment service. The user may request the message, for example by soliciting the message through first transmitting a message to the payment service, or may receive the message generally, for example, during unsolicited advertisements of the payment service or when a user's mobile phone services account reaches a minimum threshold of service. While the message is shown as an SMS message at step 302, in other embodiments, other communication protocols may be used.

The user then dials a USSD access number provided in the SMS message and receives an introduction from the payment service, at step 304. The MTG provides communication between the mobile device and the payment service. The introduction may display features offered by the payment service and required information for account setup. Additionally, in various embodiments, the introduction may include a ToS or information required to access a ToS, information that may be shared with other entities, include a mobile services carrier, and/or other required information.

At step 306, the MTG asks whether the user consents to sharing information with the payment service. The information shared with the payment service may be displayed to the user at step 304 and/or 306 or may be implied based on the information requested during account set-up. Additionally, at step 308, the MTG asks whether the mobile services carrier (e.g. the mobile phone carrier) may receive consent to share a name, address, and other identifier (e.g. a CPF used in Brazil for identification and taxation purposes) with the payment service. If the user declines, then a friendly error may appear on the screen at step 312 and operation may cease.

If the user consents to sharing of information from the mobile services carrier with the payment service, then the payment service may have the MTG request consent to the payment services ToS, Terms of Use (ToU), and/or preapproval terms for any credit extension, at step 310. As previously discussed, ToS, ToU, and other necessary information may be presented to the user during the introduction at step 304, at step 310, or a source for the material may be provided (e.g. a website address for a webpage displaying the ToS/ToU/preapproval terms). At step 314 the user responds to the request for consent. Only if the user consents and agrees does method 300 progress to step 316. Otherwise, if the user declines, the method may again cease at step 312.

At step 316, the MTG displays a name confirmation screen and requests the user to confirm his or her name at step 318. If the name is incorrect and/or cannot be confirmed, the operation may request the user to contact the mobile services carrier a, step 320. However, if the name is correct and confirmed by the user at step 318, an address confirmation screen may appear at step 322 and the MTG may request confirmation of the address at step 324. Again, if the user cannot confirm the address, the user is directed to his or her mobile services carrier to correct his or her information at step 320. If the user confirms both name and address then method 300 progresses to step 326. In various embodiments where the mobile services carrier passes information to the MTG, the MTG may utilize the name and address passed to the MTG and skip steps 316, 318, 322, and 324.

At step 326, the MTG asks the user to enter a date of birth. If the user cannot confirm the entered date of birth is correct at step 328 (e.g. due to a misspelling or typographic error), then the MTG may request the user reenter the birthdate at step 330 and proceed back to step 326. In various embodiments where the mobile services carrier passes information to the MTG, the MTG may display a date of birth for confirmation or may utilize the date of birth passed to the MTG and skip step 326 and 328 and proceed to step 332. If the date of birth is confirmed by the user at step 328, the MTG prompts the user, with the aid of a menu, to choose an email web service and enter an email address at steps 332 and 334. Once again, the actions of FIG. 3A are illustrated in the menus of FIGS. 4A and 4B, as will be discussed in more detail with respect to FIGS. 4A and 4B.

In certain embodiments, the user may not be requested to choose an email web service and enter an email address at steps 332 and 334 (in which case, FIG. 4B would not include the displays related to providing an email address, namely the middle three displays). In these embodiments, after step 328, the process goes directly to step 338 in FIG. 3B. Entering an email address can be time-consuming and difficult with feature phones. Additionally, due to time limits for completing an account creation, the user may not have sufficient time to provide the requested information. Thus, in these embodiments, no email address email is needed from the user. Instead, the payment service and/or MTG may create an email for the user to be associated with the account to be created by using the phone number corresponding to the user phone. For example, if the user phone number is 555-234-5678, the email address created may be 5552345678@serviceprovider.com or other email host name. The email host name can be specific to accounts created through feature phones or can be broader to include all payment accounts.

In another embodiment, the email address is created using a combination of phone number, country, and mobile operator. For example, an email address may be structured as {phone number}-{country}-{operator}@paypal-email2sms.com. Note that other identifiers can be used in various combinations and sequences, with or without separators or spaces, to create an email uniquely associated with the user and the user account. The email address may be presented at step 336 and confirmation of receipt requested. If the user confirms the email address, method 300 may continue to FIG. 3B.

Moving to FIG. 3B, FIG. 3B is an exemplary method for completion of account creation using Interactive Voice Response (IVR) between a feature phone and a payment service, according to one embodiment. The IVR functionality may be provided by MTG. At step 338, the user receives a call from the payment service through the MTG and an introduction is provided to the user at step 340. The introduction may include a reminder that the user has consented to the TOU and also recites some account data, such as user name, address, and/or email address.

At step 342, the payment service requests the user to enter a credit card number that is added to the user's cloud-based wallet as a method of payment. Although step 342 displays that only a credit card may be allowed, in various embodiments, the payment service may allow other financial information to be entered. For example, the payment service may accept debit cards, prepaid credit cards, checking and/or savings accounts, or other financial source. However, due to security constraints and/or company policy, the payment service may prefer or accept only desired financial accounts.

At the steps collectively labeled 344, the MTG receives and validates the user's credit card information using the payment service, and only proceeds forward upon receiving and entering valid credit card data. In order to validate the credit card information, the user enters a credit card number, where the MTG pay utilizes services of the payment service to determine if the credit card number is valid (e.g. contains a proper number of digits for the credit card type). Should the credit card number be valid, the MTG may request, on behalf of the payment service, an expiration date, which may be verified, again using the payment service. If the expiration date is a valid date and is not expired, the MTG may request a card security number listed on the back of the card. Again, the MTG may verify the authenticity of the card security number using the payment service. In various embodiments, the MTG may also validate the credit card using services of the MTG and/or may utilize the mobile services carrier to match a credit card number on file to the credit card number provided. Should the cards not match, the MTG may request a new card and/or may request additional information corresponding to the provided credit card number for security and theft protection reasons.

If the MTG receives a valid credit card, expiration date, and card security number, the payment service may verify the credit card is also valid to be utilized with the payment service by checking to make sure the data entered is valid (e.g. the card can be charged), that sufficient funds are available with the bank and the card is not closed or frozen (e.g. rejected by the bank), and that the card is not already on file with another user. If the card is not valid to be used by the payment service, the MTG may start over and request a new credit card to be entered. Alternatively, additional information may be requested from the user to validate the card. In various embodiments where the mobile services carrier passes information to the MTG, the MTG may repeat a credit card information passed to the MTG for confirmation or may utilize the credit card information received and proceed to the steps collectively labeled 346.

If the card is determined to be valid, at the steps collectively labeled 346 the user enters and re-enters a Personal Identification Number (PIN) that is used in future transactions to verify the user. The payment service may request the user to enter a 4-8 digit PIN or any alphanumeric PIN. The MTG providing the IVR service on behalf of the payment service may receive a 4-8 digit PIN and confirm the PIN syntax is correct. The MTG may then request the user to re-enter the PIN in order to confirm the user correctly knows the PIN. If the PIN syntax is incorrect or the user enters an incorrect PIN the second time, the MTG may restart the process. However, if the PIN's entered match and the user has successfully selected a PIN, the MTG may complete the call for the payment service at step 348 and transmit an SMS to the user. At step 350, the user receives the SMS with a brief introduction and instructions for the user to access the cloud-based wallet for future transactions.

FIGS. 4A and 4B is exemplary menu screen shots that may be provided on an interface of a feature phone (e.g., a LCD screen) from a MTG, according to an embodiment. Thus, the feature phone menu screen shots of FIGS. 4A and 4B may correspond generally to method 300 of FIG. 3A. Although FIGS. 4A and 4B display an exemplary interface of a feature phone, in various embodiments, other user devices may be used.

FIG. 4A displays 5 screens showing steps 302 through 324 of FIG. 3A. In the first screen (the leftmost screen), the feature phone displays a user received introduction from a payment service (using an MTG). The introduction may be transmitted using SMS or another messaging protocol. In the second screen (to the right of the leftmost screen), the MTG requests user consent to sharing information, including a name, address, and user identifier (e.g. a CPF used in Brazil), with the payment service. The user may be prompted to enter a 1 or 2 in order to confirm or decline sharing of information, respectively. The interactive message may be transmitted during a USSD messaging session with the user device. The transmitted message may correspond to steps 306, 308, and 312 of FIG. 3A.

If the user agrees to share information with the payment service, the MTG may proceed to screen three (the middle screen), where the MTG requests consent to ToS, ToU, and/or preapproval terms of the payment service. The third screen may correspond to steps 310, 312, and 314 of FIG. 3A and be transmitted during the USSD messaging session or using another messaging protocol. For example, the user may instead send an SMS message to a specific number of the MTG and/or with a specific message as an acceptance of the ToS/ToU/preapproval terms.

Once the user has accepted the payment service's terms, the information shared with the payment service may be displayed to the user so the user may confirm the information is correct. Thus, at the fourth screen (to the right of the middle screen) the MTG requests confirmation of the user's name. The fourth screen may correspond to steps 316, 318, and 320 of FIG. 3A. Further, at the fifth screen (the right most screen), the user's address held by the mobile services carrier is displayed to the user and a confirmation of the address is requested. The fifth screen may correspond to steps 320, 322, and 324 of FIG. 3A. As previously discussed, the fourth and fifth screens may be skipped where information is passed to the MTG and thus not presented to the user.

Moving to FIG. 4B, FIG. 4B displays 5 screens corresponding to steps 324-336 of FIG. 3A. At the first screen (the leftmost screen), the user is requested to enter a date of birth. In various embodiments, the mobile services carrier may also have the date of birth for the user and the MTG may request confirmation of a displayed date of birth instead. The first screen may correspond to steps 326, 328 and 330 of FIG. 3A. Again, the first screen of FIG. 4B may be skipped where information is passed to the MTG from the mobile services carrier.

In the middle 3 screens, the user may be requested to enter an email address. The middle three screens may correspond to steps 332, 334 and 336, respectively, of FIG. 3A. As previously discussed, the user may not possess an email address or may find the processes of entering an email address difficult or time-consuming. In other embodiments, limitations on a time limit to establish the account may prevent the user from entering the email address. Thus, in various embodiments, the middle three screens may not be presented to the user. Instead, an email address may be generated for the user. The email address may be generated based on user information, including a phone number of the user. In other embodiments, the email address may be randomly generated.

Regardless of the method of determining an email address, at the fourth screen (to the right of the middle screen), an email address may be presented to the user and confirmation of the email address may be requested. If the user confirms the email address, the messaging session ends at the fifth screen (the right most screen), and a call may be placed to the user. Thus, after the fifth screen, the user of the mobile device may receive a call using IVR with the MTG and completion of account set-up may be completed as described with respect to FIG. 3B.

Figure 5:
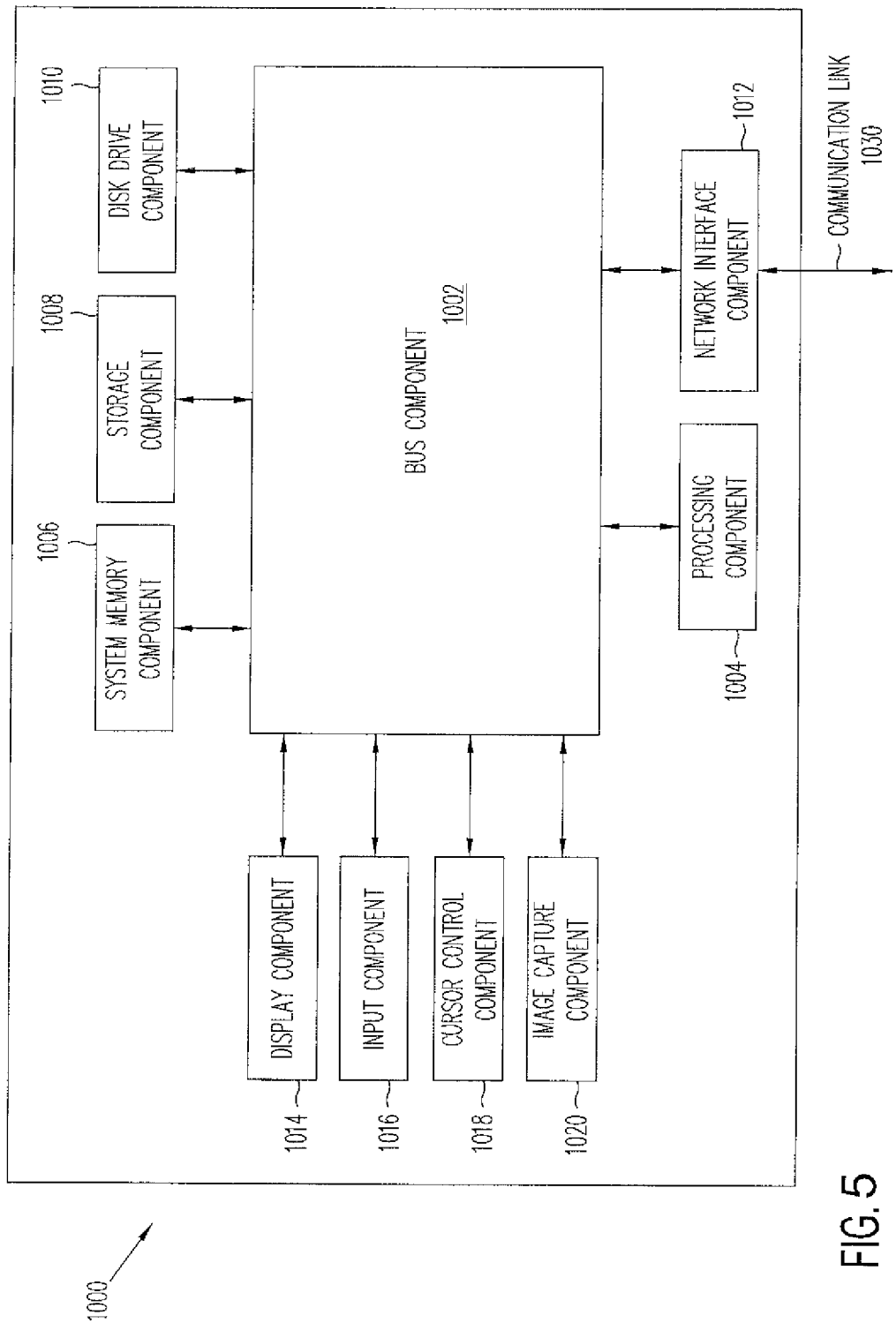
FIG. 5 is a block diagram of a computer system suitable for implementing one or more components in FIG. 1, according to an embodiment.

FIG. 5 is a block diagram of an example computer system 1000 suitable for implementing various methods and devices described herein. In various implementations, a MTG, a mobile carrier gateway, and a computer at the payment service may conform to the general description shown in FIG. 5. Such computers may include a network computing device (e.g., a network server, a computer processor, an electronic communications interface, etc.) capable of communicating with one or more networks. Accordingly, it should be appreciated that each of the devices may be implemented as the computer system 1000 for communication with networks in a manner as follows.

In accordance with various embodiments of the present disclosure, the computer system 1000, such as a network server, includes a bus component 1002 or other communication mechanisms for communicating information, which interconnects subsystems and components, such as processing component 1004 (e.g., processor, micro-controller, digital signal processor (DSP), etc.), system memory component 1006 (e.g., RAM), static storage component 1008 (e.g., ROM), disk drive component 1010 (e.g., magnetic or optical), network interface component 1012 (e.g., modem or Ethernet card), display component 1014 (e.g., cathode ray tube (CRT) or liquid crystal display (LCD)), input component 1016 (e.g., keyboard), cursor control component 1018 (e.g., mouse or trackball), and image capture component 1020 (e.g., analog or digital camera). In one implementation, disk drive component 1010 may comprise an array having one or more disk drive components.

In accordance with embodiments of the present disclosure, computer system 1000 performs specific operations by processor 1004 executing one or more sequences of one or more instructions contained in system memory component 1006. Such instructions may be read into system memory component 1006 from another computer readable medium, such as static storage component 1008 or disk drive component 1010. In other embodiments, hard-wired circuitry may be used in place of (or in combination with) software instructions to implement the present disclosure.

Logic may be encoded in a computer readable medium, which may refer to any medium that participates in providing instructions to processor 1004 for execution. Such a medium may take many forms, including but not limited to, non-volatile media and volatile media. In one embodiment, the computer readable medium is non-transitory. In various implementations, non-volatile media includes optical or magnetic disks, such as disk drive component 1010, and volatile media includes dynamic memory, such as system memory component 1006. In one aspect, data and information related to execution instructions may be transmitted to computer system 1000 via a transmission media, such as in the form of acoustic or light waves, including those generated during radio wave and infrared data communications. In various implementations, transmission media may include coaxial cables, copper wire, and fiber optics, including wires that comprise bus 1002.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other non-transitory medium from which a computer is adapted to read.

In various embodiments of the present disclosure, execution of instruction sequences to practice the present disclosure may be performed by computer system 1000. In various other embodiments of the present disclosure, a plurality of computer systems 1000 coupled by communication link 1030 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1000 may transmit and receive messages, data, information and instructions, including one or more programs (i.e., application code) through communication link 1030 and communication interface 1012. Received program code may be executed by processor 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims

What is claimed is:

1. A system comprising:
   a non-transitory memory storing feature phone messaging information comprising a messaging protocol using a wireless phone communication channel that includes non-Internet based communications; and
   one or more hardware processors in communication with the non-transitory memory and configured to read instructions from the non-transitory memory to cause the system to perform operations comprising:
   receiving a request to establish a user account from a mobile transaction gateway, wherein the mobile transaction gateway comprises at least an internal gateway in communication, through an Over The Air (OTA) server, with a mobile services carrier, and wherein the request originates from a mobile device of a user, and wherein the mobile device communicates the request to the mobile services carrier using the messaging protocol using the non-Internet based communications;
   transmitting an option to create the user account to the mobile device of the user through the mobile transaction gateway, wherein the option is displayed on an interface of the mobile device, wherein the internal gateway communicates the option through the Over The Air (OTA) server to the mobile services carrier, and wherein the option is communicated to the mobile device by the mobile services carrier through the messaging protocol by the mobile services carrier using the non-Internet based communications;
   receiving information corresponding to the user account if the user accepts the option, wherein the information comprises at least a user phone number and a user identifier, and wherein the information is received using the messaging protocol;
   requesting user financial information and a personal identification number (PIN);
   receiving the user financial information and the PIN; and
   creating the user account using the information, the user financial information and the PIN.

2. The system of claim 1, wherein the one or more hardware processors are further configured to read the instructions from the non-transitory memory to cause the system to perform operations comprising:
   creating the user account without requesting an email address, and wherein the user account includes an email address corresponding to the user phone number.

3. The system of claim 1, wherein the messaging protocol is one of Unstructured Supplementary Service Data (USSD) protocol, Short Message Service (SMS) protocol, a SIM Tool Kit (STK) application of the mobile device, and a Java 2 Platform, Micro Edition (2JME) application of the mobile device.

4. The system of claim 1, wherein the information is received from a mobile services carrier.

5. The system of claim 1, wherein the information further comprises a Terms of Service (ToS) approval, a user address, and a user date of birth.

6. The system of claim 1, wherein the option corresponds to a text-based menu on the interface of the mobile device using one of SMS and USSD.

7. The system of claim 1, wherein the one or more hardware processors are further configured to read the instructions from the non-transitory memory to cause the system to perform operations comprising:
  requesting the user financial information and the PIN using Interactive Voice Response (IVR).

8. The system of claim 1, wherein the user account corresponds to a payment account with a payment provider.

9. The system of claim 8, wherein the one or more hardware processors are further configured to read the instructions from the non-transitory memory to cause the system to perform operations comprising:
  receiving a request to purchase mobile phone services corresponding to the mobile device; and
  completing the request using the payment account with the payment provider.

10. A method comprising:
  receiving a request to establish a user account from a mobile transaction gateway, wherein the mobile transaction gateway comprises at least an internal gateway in communication, through an Over The Air (OTA) server, with a mobile services carrier, and wherein the request originates from a mobile device of a user, and wherein the mobile device communicates the request to the mobile services carrier using a messaging protocol having a wireless phone communication channel that includes non-Internet based communications;
  transmitting an option to create the user account to the mobile device of the user through the mobile transaction gateway, wherein the option is displayed on an interface of the mobile device, wherein the internal gateway communicates the option through the Over The Air (OTA) server to the mobile services carrier, and wherein the option is communicated to the mobile device by the mobile services carrier through the messaging protocol by the mobile services carrier using the non-Internet based communications;
  receiving information corresponding to the user account if the user accepts the option, wherein the information comprises at least a user phone number and a user identifier, and wherein the information is received using the messaging protocol;
  requesting user financial information and a personal identification number (PIN);
  receiving the user financial information and the PIN; and
  creating, using one or more hardware processors of a server, the user account using the information, the user financial information and the PIN.

11. The method of claim 10, wherein the creating the user account comprises creating the user account without requesting an email address, and wherein the user account includes an email address corresponding to the user phone number.

12. The method of claim 10, wherein the messaging protocol is one of Unstructured Supplementary Service Data (USSD) protocol, Short Message Service (SMS) protocol, a SIM Tool Kit (STK) application of the mobile device, and a Java 2 Platform, Micro Edition (2JME) application of the mobile device.

13. The method of claim 10, wherein the information is received from a mobile services carrier.

14. The method of claim 10, wherein the information further comprises a Terms of Service (ToS) approval, a user address, and a user date of birth.

15. The method of claim 10, the option corresponds to a text-based menu on the interface of the mobile device using one of SMS and USSD.

16. The method of claim 10, wherein the requesting the user financial information and the PIN comprises requesting the user financial information and the PIN using Interactive Voice Response (IVR).

17. The method of claim 10, wherein the user account corresponds to a payment account with a payment provider.

18. The method of claim 17 further comprising:
  receiving a request to purchase mobile phone services corresponding to the mobile device; and
  completing the request using the payment account with the payment provider.

19. A non-transitory machine-readable medium having stored thereon machine-readable instructions executable to cause a machine to perform operations comprising:
  receiving a request to establish a user account from a mobile transaction gateway, wherein the mobile transaction gateway comprises at least an internal gateway in communication, through an Over The Air (OTA) server, with a mobile services carrier, and wherein the request originates from a mobile device of a user, and wherein the mobile device communicates the request to the mobile services carrier using a messaging protocol having a wireless phone communication channel that includes non-Internet based communications;
  transmitting an option to create the user account to the mobile device of the user through the mobile transaction gateway, wherein the option is displayed on an interface of the mobile device, wherein the internal gateway communicates the option through the Over The Air (OTA) server to the mobile services carrier, and wherein the option is communicated to the mobile device by the mobile services carrier through the messaging protocol by the mobile services carrier using the non-Internet based communications;
  receiving information corresponding to the user account if the user accepts the option, wherein the information comprises at least a user phone number and a user identifier, and wherein the information is received using the messaging protocol;
  requesting user financial information and a personal identification number (PIN);
  receiving the user financial information and the PIN; and
  creating the user account using the information, the user financial information and the PIN.

20. The non-transitory machine-readable medium of claim 19, wherein the communication is with Unstructured Supplementary Service Data (USSD) protocol.

* * * * *